(12) United States Patent
Chadaga et al.

(10) Patent No.: US 12,120,001 B1
(45) Date of Patent: Oct. 15, 2024

(54) SYSTEMS AND METHODS FOR DETECTING NETWORK CONGESTION AND AUTOMATICALLY DEPLOYING A NETWORK SLICE

(71) Applicant: Verizon Patent and Licensing Inc., Basking Ridge, NJ (US)

(72) Inventors: Deepak Chadaga, Coppell, TX (US); Antonio M. Osorio, Jersey City, NJ (US); Tyler Kates, Austin, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/476,969

(22) Filed: Sep. 28, 2023

(51) Int. Cl.
*H04L 41/40* (2022.01)
*H04L 41/0895* (2022.01)
*H04L 41/16* (2022.01)
*H04L 47/11* (2022.01)

(52) U.S. Cl.
CPC .......... *H04L 41/40* (2022.05); *H04L 41/0895* (2022.05); *H04L 41/16* (2013.01); *H04L 47/11* (2013.01)

(58) Field of Classification Search
CPC ..... H04L 41/40; H04L 41/0895; H04L 41/16; H04L 47/11
See application file for complete search history.

*Primary Examiner* — Blake J Rubin

(57) ABSTRACT

A device may receive network congestion data associated with a network providing a network slice to a user device and that includes data identifying a number of users, an average throughput, a latency, and one or more key performance indicators associated with the network. The device may receive media data associated with the user device and may receive weather data associated with the user device. The device may process the number of users, the average throughput, the latency, and the one or more key performance indicators, with a deep learning model, to generate a congestion decision for the network. The device may selectively activate a new network slice for the user device based on the congestion decision indicating congestion in the network, or may maintain the network slice for the user device based on the congestion decision indicating no congestion in the network.

20 Claims, 9 Drawing Sheets

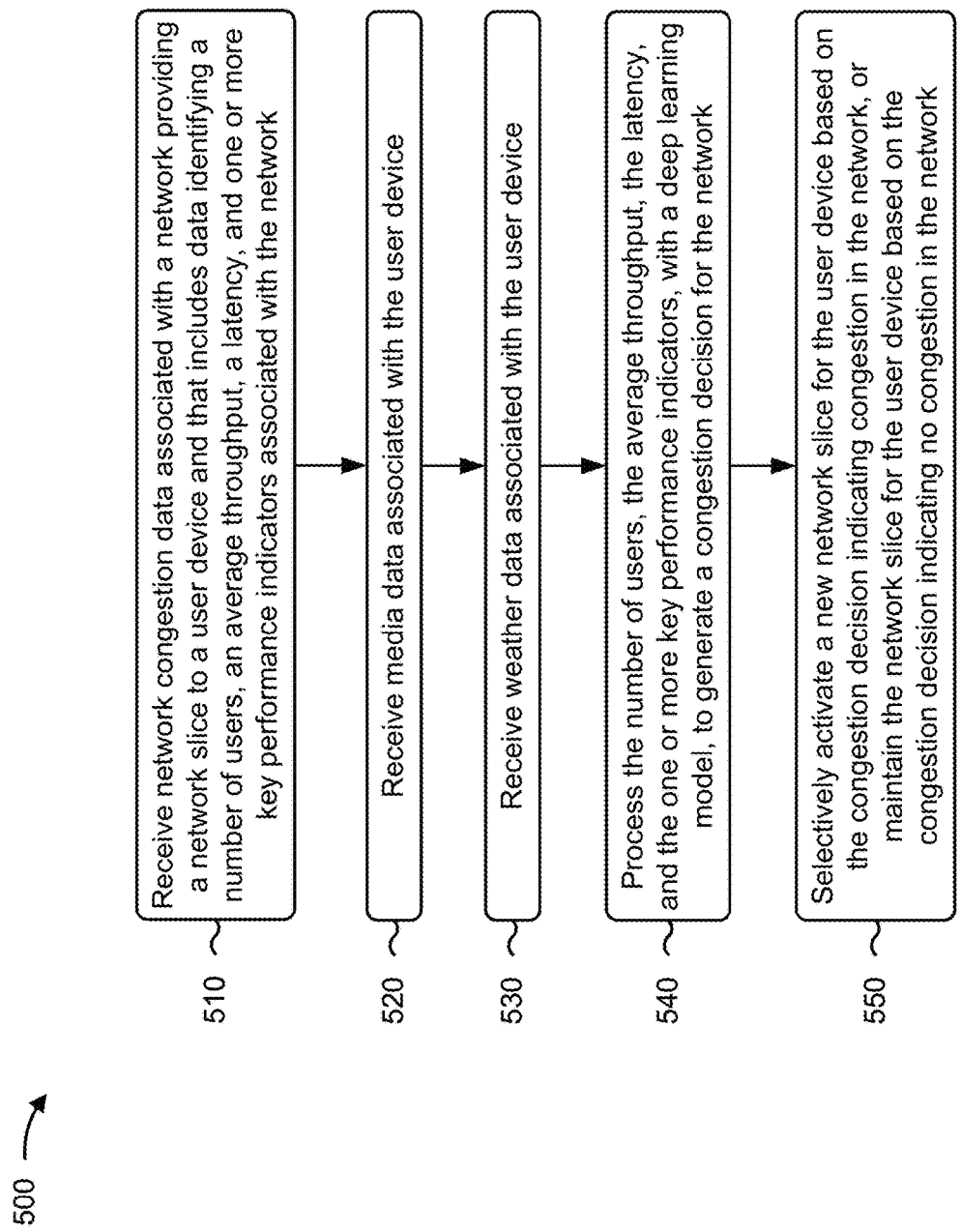

SYSTEMS AND METHODS FOR DETECTING NETWORK CONGESTION AND AUTOMATICALLY DEPLOYING A NETWORK SLICE

BACKGROUND

Network slicing overlays multiple virtual networks on top of a shared network domain (e.g., a set of shared network and computing resources). Each slice of a network may have its own logical topology, security rules, and performance characteristics within limits imposed by underlying physical networks. Different network slices can be dedicated to different purposes, such as ensuring that a specific application or service gets priority access to capacity and delivery or isolating traffic for specific users or device classes.

BRIEF DESCRIPTION OF THE DRAWINGS

FIG. 5 is a flowchart of an example process for utilizing a deep learning model to detect network congestion and automatically deploy a network slice.

DETAILED DESCRIPTION OF EXAMPLE EMBODIMENTS

Figure 1A:
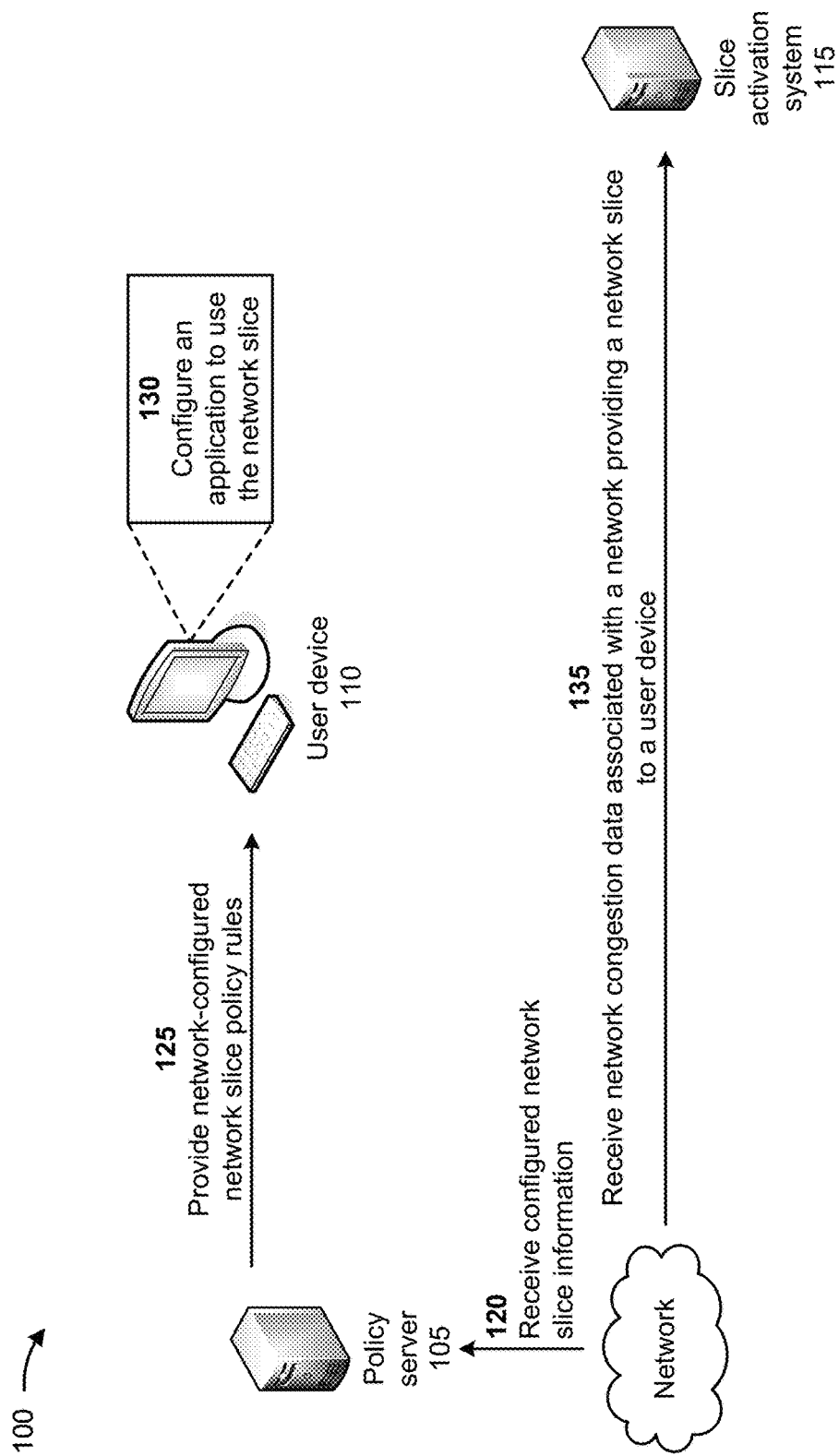
FIGS. 1A-1E are diagrams of an example associated with utilizing a deep learning model to detect network congestion and automatically deploy a network slice.

The following detailed description of example implementations refers to the accompanying drawings. The same reference numbers in different drawings may identify the same or similar elements.

Critical infrastructure users (e.g., government employees, utility employees, emergency personnel, and/or the like) may utilize network slices to receive critical applications that are to be guaranteed service. However, during times of network congestion (e.g., due to natural disasters, events, network outages, and/or the like), a network service provider may be unable to guarantee that network slices will be available for critical infrastructure users. Thus, current techniques for handling network slices during network congestion consume computing resources (e.g., processing resources, memory resources, communication resources, and/or the like), networking resources, and/or other resources associated with failing to provide network slices to critical infrastructure users during times of network congestion, providing a poor user experience for critical infrastructure users during times of network congestion, losing network traffic during times of network congestion, and/or the like.

Some implementations described herein provide a slice activation system that utilizes a deep learning model to detect network congestion and automatically deploy a network slice. For example, the slice activation system may receive network congestion data associated with a network providing a network slice to a user device. The network congestion data may include data identifying a number of users, an average throughput, a latency, and one or more key performance indicators associated with the network. The slice activation system may receive media data associated with the user device, and may receive weather data associated with the user device. The slice activation system may process the number of users, the average throughput, the latency, and the one or more key performance indicators, with a deep learning model, to generate a congestion decision for the network, and may activate a new network slice for the user device based on the congestion decision indicating congestion in the network. The slice activation system may select a region, a duration, and a type for the new network slice based on activating the new network slice and based on the media data and the weather data, and may cause the network to provision the new network slice for the user device based on the region, the duration, and the type for the new network slice.

In this way, the slice activation system utilizes a deep learning model to detect network congestion and automatically deploy a network slice. For example, the slice activation system may utilize deep learning and network-based intelligent network slice selection and activation for a network (e.g., a 5G network) to ensure that critical infrastructure users (e.g., public safety customers) may have a minimum service in all conditions, and particularly during network congestion. The slice activation system may ensure, through deep learning rules, that network resources are always allocated for critical infrastructure users when required, and not when network traffic conditions are optimal or when a user device of a user requests a network slice. Thus, the slice activation system may conserve computing resources, networking resources, and/or other resources that would have otherwise been consumed by failing to provide network slices to critical infrastructure users during times of network congestion, providing a poor user experience for critical infrastructure users during times of network congestion, losing network traffic during times of network congestion, and/or the like.

FIGS. 1A-1E are diagrams of an example 100 associated with utilizing a deep learning model to detect network congestion and automatically deploy a network slice. As shown in FIGS. 1A-1E, example 100 includes a policy server 105 and a user device 110 associated with a slice activation system 115. The policy server 105 may be associated with network that includes a radio access network (RAN) and a core network (e.g., a fifth generation (5G) RAN and core network). Further details of the policy server 105, the user device 110, the slice activation system 115, and the network provided elsewhere herein.

As shown in FIG. 1A, and by reference number 120, the policy server 105 may receive configured network slice information from the network. For example, the network may provide multiple network slices to user devices 110 associated with the network. The policy server 105 may receive, from the network, the configured network slice information identifying a network slice available to the user device 110. The policy server 105 may utilize the configured network slice information to generate network-configured network slice policy rules that, when provisioned by the user device 110, cause the user device 110 to be configured to utilize the network slice.

As further shown in FIG. 1A, and by reference number 125, the policy server 105 may provide network-configured network slice policy rules to the user device 110. For example, the policy server 105 may generate the network-configured network slice policy rules based on the configured network slice information, and may provide the network-configured network slice policy rules to the user device 110. The user device 110 may receive the network-configured network slice policy rules from the policy server 105 and may execute the network-configured network slice policy rules.

As further shown in FIG. 1A, and by reference number 130, the user device 110 may configure an application to use the network slice. For example, when the user device 110 executes the network-configured network slice policy rules, the execution may cause the user device 110 to configure an application to use the network slice provisioned for the application of the user device 110. In this way, the network causes the user device 110 to utilize the application via the network slice. In some implementations, the policy server 105 may inform the user device 110 to provide the application on the network slice. In some implementations, the user device 110 may be associated with a public safety user (e.g., a critical infrastructure user).

As further shown in FIG. 1A, and by reference number 135, the slice activation system 115 may receive network congestion data associated with the network providing the network slice to the user device 110. For example, the slice activation system 115 may continuously receive the network congestion data from the network, may periodically receive the network congestion data from the network, may receive the network congestion data from the network based on requesting the network congestion data from the network, and/or the like. The network congestion data may include data identifying a number of users (e.g., user devices 110) utilizing the network, an average throughput of the network, a latency of the network, and/or one or more other key performance indicators (KPIs) associated with the network (e.g., an availability KPI, an accessibility KPI, a retainability KPI, an integrity KPI, a mobility KPI).

Figure 1B:
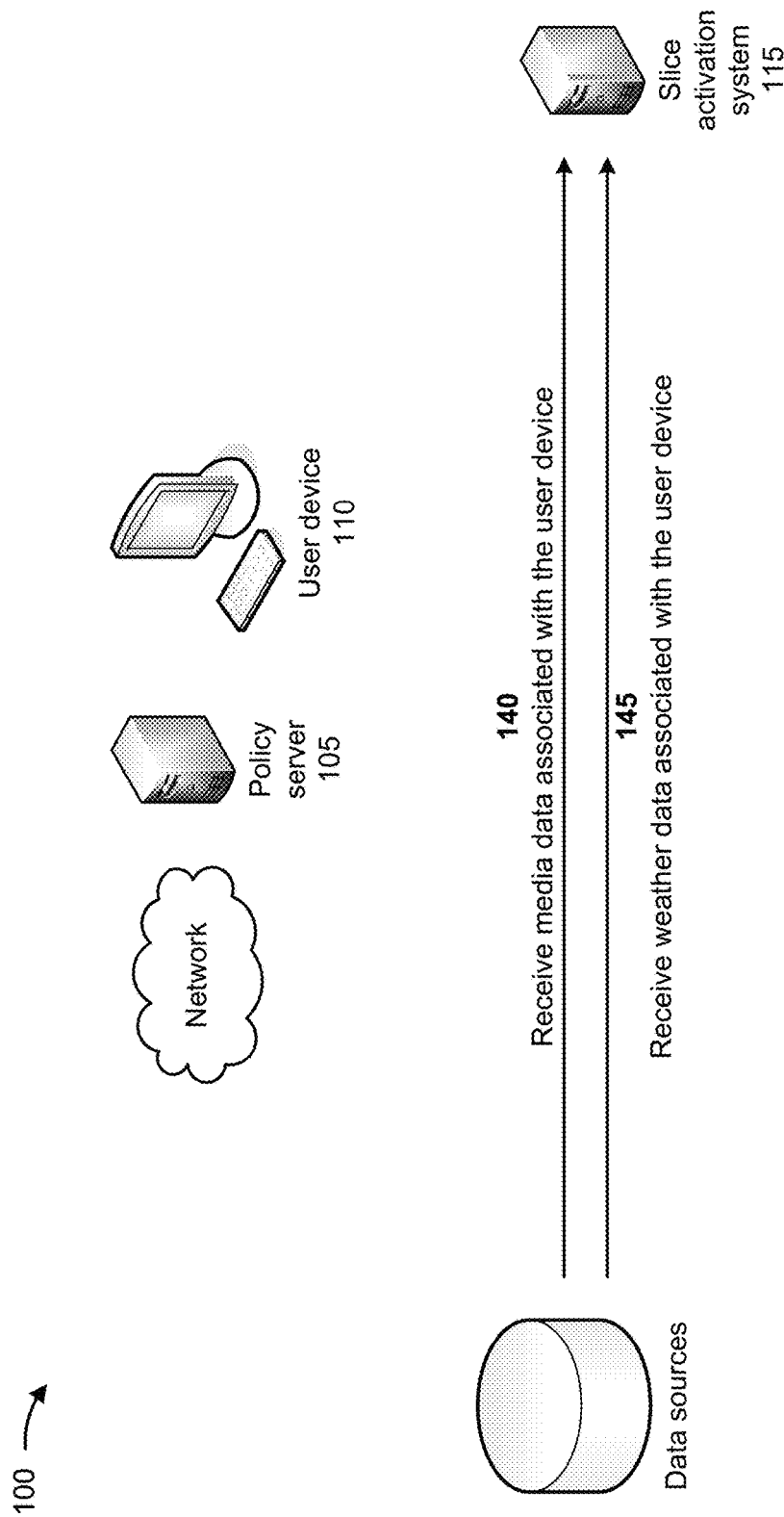

As shown in FIG. 1B, and by reference number 140, the slice activation system 115 may receive media data associated with the user device 110. For example, one or more data sources may store the media data associated with the user device 110. The media data may include data identifying news feeds, social media feeds (e.g., identifying events, such as concerts, sporting events, demonstrations, and/or the like), planned events (e.g., identifying dates and times associated with events, such as concerts, sporting events, elections, and/or the like), and/or the like that may affect network availability for the user device 110. In some implementations, the slice activation system 115 may continuously receive the media data from the data sources, may periodically receive the media data from the data sources, may receive the media data from the data sources based on requesting the media data from the data sources, and/or the like.

As further shown in FIG. 1B, and by reference number 145, the slice activation system 115 may receive weather data associated with the user device 110. For example, one or more data sources may store the weather data associated with the user device 110. The weather data may include data identifying a natural disaster (e.g., a fire, a hurricane, a blizzard, an earthquake, a tornado, and/or the like), a weather event (e.g., a lightning storm, a heavy rainstorm, a hailstorm, and/or the like), and/or the like that may affect network availability for the user device 110. In some implementations, the slice activation system 115 may continuously receive the weather data from the data sources, may periodically receive the weather data from the data sources, may receive the weather data from the data sources based on requesting the weather data from the data sources, and/or the like.

Figure 1C:
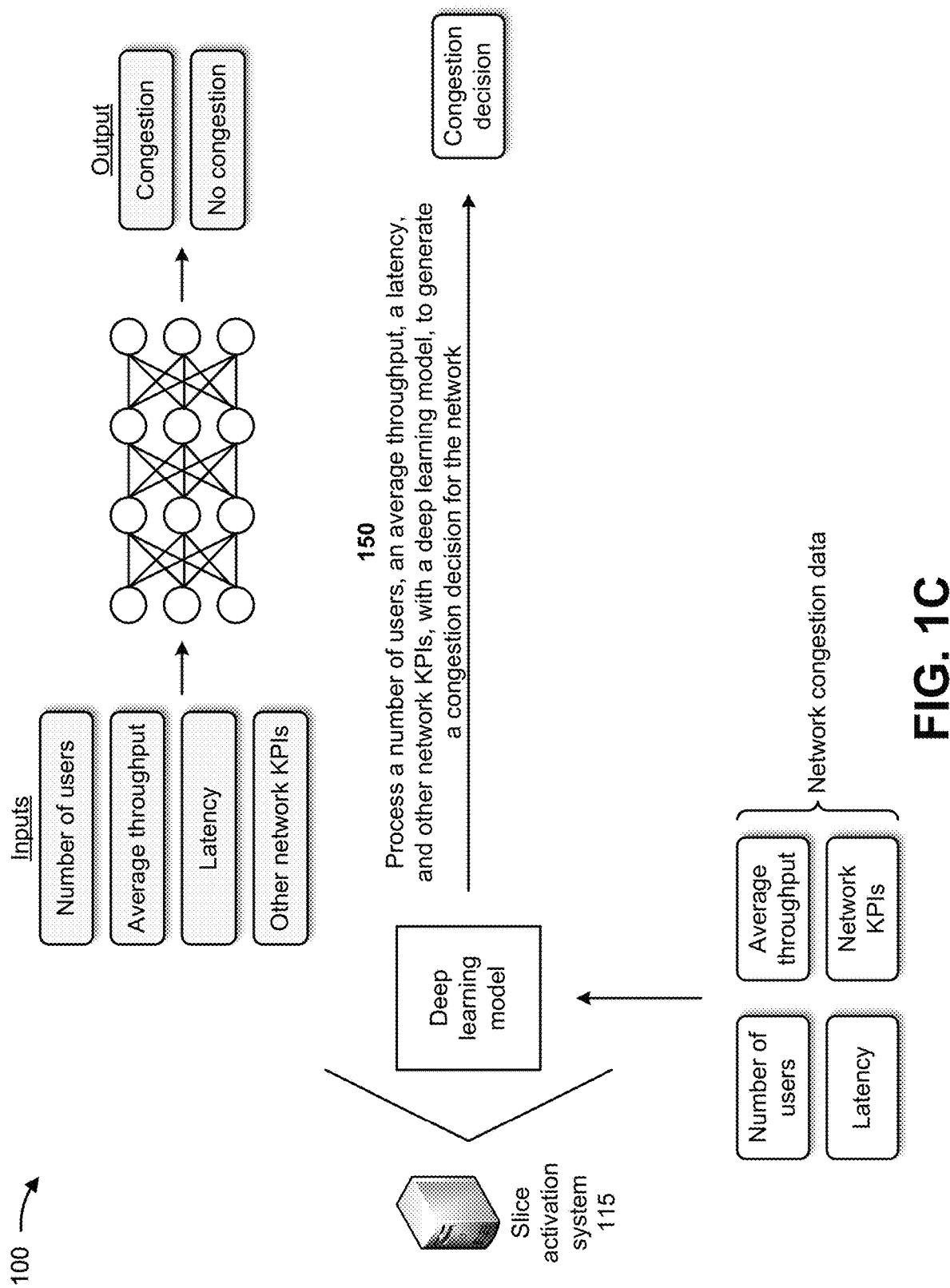

As shown in FIG. 1C, and by reference number 150, the slice activation system 115 may process the network congestion data (e.g., the number of users, the average throughput, the latency, and the other network KPIs), with a deep learning model, to generate a congestion decision for the network. For example, the slice activation system 115 may be associated with the deep learning model. In some implementations, the deep learning model may include a recurrent neural network (RNN) model. An RNN model is a type of neural network where output from a previous step is fed as input to a current step. An RNN model is a type of artificial neural network characterized by direction of the flow of information between its layers. In contrast to a unidirectional feedforward neural network, an RNN model is a bi-directional artificial neural network, meaning that the RNN model allows the output from some nodes to affect subsequent input to the same nodes. In some implementations, the slice activation system 115 may train the deep learning model to predict a congestion decision for the network based on network congestion data. Further details of training a machine learning model, such as the deep learning model, are provided below in connection with FIG. 2.

The slice activation system 115 may utilize the deep learning model to determine the congestion decision for the network based on the network congestion data (e.g., the number of users, the average throughput, the latency, and the other network KPIs). In some implementations, the congestion decision may indicate congestion in the network. Alternatively, the congestion decision may indicate no congestion in the network. The network may be congested when a bandwidth required to serve all active applications (e.g., utilized by user devices 110) is substantially equal to or exceeds an available bandwidth that the network can support, or when a quantity of active users (e.g., user device 110) of the network approach the maximum quantity that the network can support. When the congestion decision indicates no congestion in the network, the slice activation system 115 may maintain the network slice for the user device 110 and does not need to activate a new network slice for the user device 110.

Figure 1D:
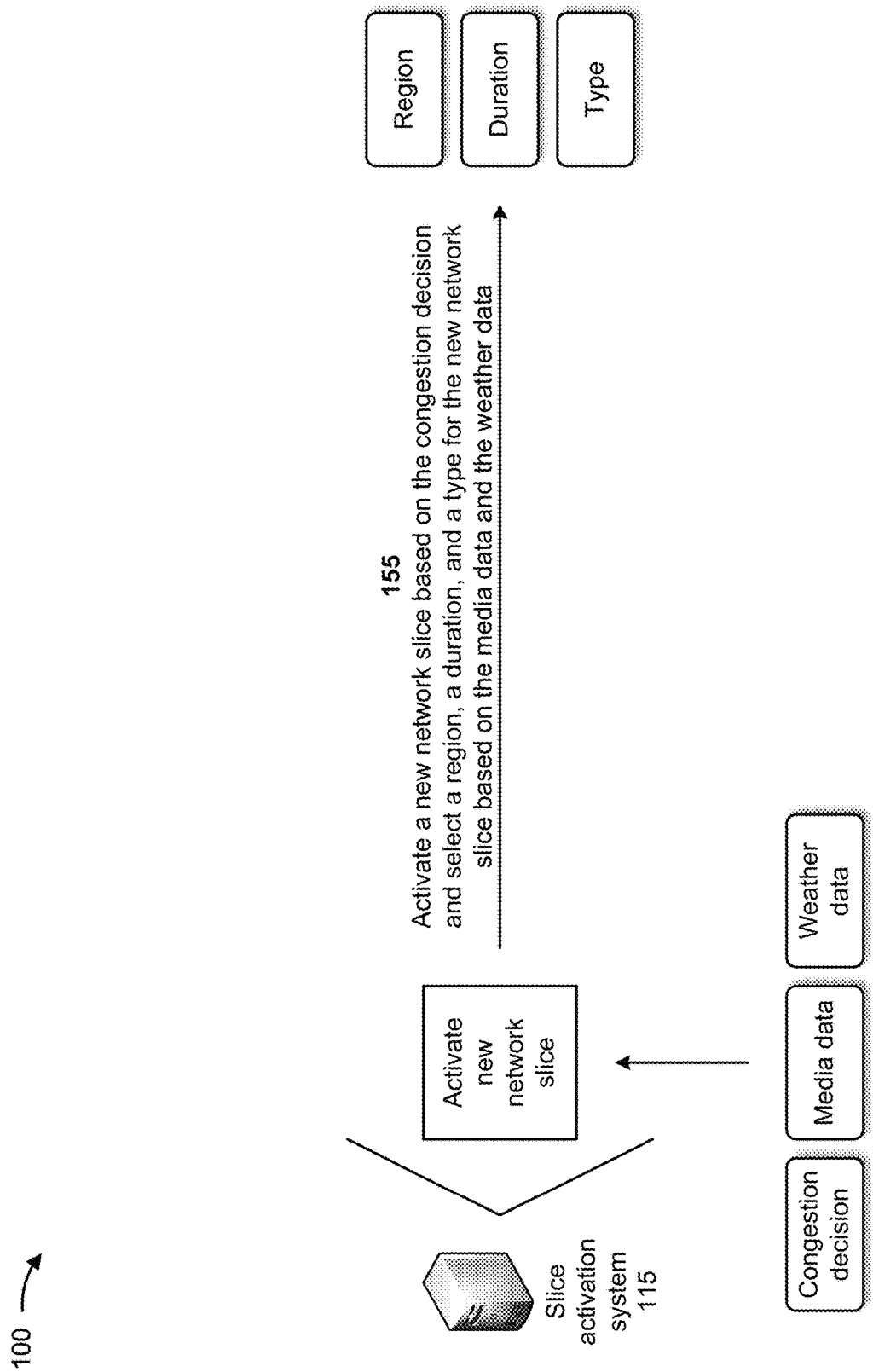

As shown in FIG. 1D, and by reference number 155, the slice activation system 115 may activate a new network slice based on the congestion decision and may select a region, a duration, and a type for the new network slice based on the media data and weather data. For example, when the congestion decision indicates congestion in the network, the slice activation system 115 may activate the new network slice for the user device 110. In this way, the slice activation system 115 may manage network resources in a cost-effective way by causing network resources to be allocated through a network slice to public safety customers only when the network congestion data dictates allocation of such network resources.

The slice activation system 115 may select a region for the new network slice (e.g., a geographical region associated with the user device 110), a duration of the new network slice (e.g., as long as the network congestion is predicted to exist), and a type for the new network slice (e.g., a public safety application type, a streaming service type, an industrial application type, a voice-over-new-radio application type, an autonomous vehicle application type, and/or the like) based on the media data and the weather data. For example, if the media data indicates that a sporting event will occur for three hours on a particular day, the slice activation system 115 may select a region associated with a location of the sporting event and a duration of three hours for the new network slice. In another example, if the weather data indicates that a storm will last for thirty-six hours and affect a particular location, the slice activation system 115 may select a region associated with the particular location and a duration of at least thirty-six hours for the new network slice.

Figure 1E:
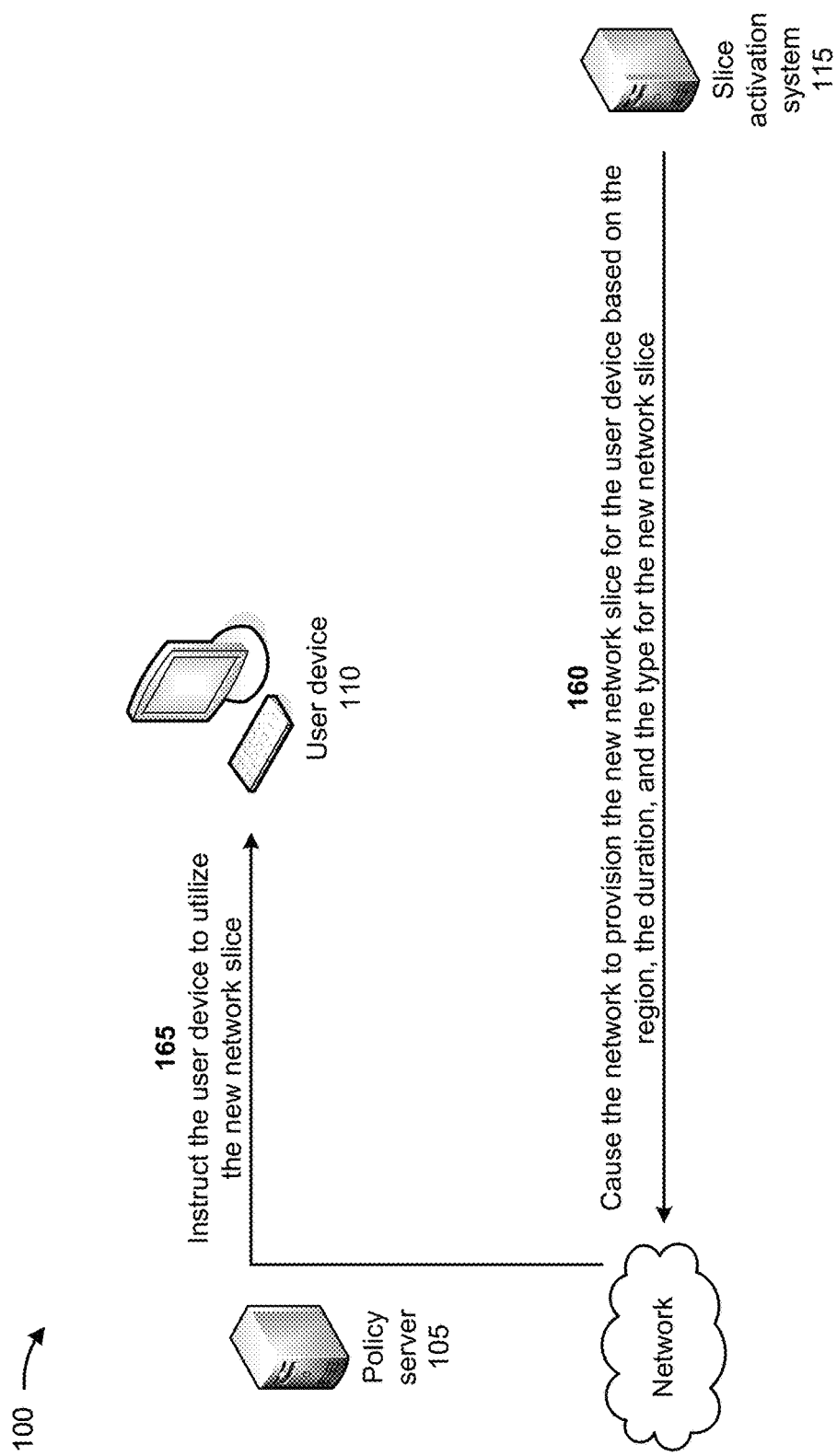

As shown in FIG. 1E, and by reference number 160, the slice activation system 115 may cause the network to provision the new network slice for the user device 110 based on the region, the duration, and the type for the new network slice. For example, the slice activation system 115 may provide, to the policy server 105, new configured network slice information identifying the new network slice available to the user device 110, as well as the region, the duration, and the type for the new network slice. The policy server 105 may utilize the new configured network slice information to generate new network slice policy rules that, when provisioned by the user device 110, cause the user device 110 to be configured to utilize the new network slice.

As further shown in FIG. 1E, and by reference number 165, the network and/or the policy server 105 may instruct the user device 110 to utilize the new network slice. For example, the policy server 105 may generate the new network slice policy rules based on the new configured network slice information, and may provide the new network slice policy rules to the user device 110. The user device 110 may receive the new network slice policy rules from the policy server 105 and may execute the new network slice policy rules. When the user device 110 executes the new network slice policy rules, the execution may cause the user device 110 to configure the application to use the new network slice provisioned for the application of the user device 110.

Thus, the slice activation system 115 may gather data associated with events (e.g., via one or more application programming interfaces (APIs)) and may combine this data with the network congestion data to make a predictive decision on whether congestion might occur or has occurred in the network (e.g., which may result in public safety customers being unable to perform basic tasks on user devices 110). While implementations described herein focus on public safety customers, the slice activation system 115 may also be utilized to provide an improved level of service during predicted network congestion for other types of customers, at a different threshold than the public safety customers.

In this way, the slice activation system 115 utilizes a deep learning model to detect network congestion and automatically deploy a network slice. For example, the slice activation system 115 may utilize deep learning and network-based intelligent network slice selection and activation for a network to ensure that critical infrastructure users may have a minimum service in all conditions, and particularly during network congestion. The slice activation system 115 may ensure, through deep learning rules, that network resources are always allocated for critical infrastructure users when required, and not when network traffic conditions are optimal or when a user device 110 of a user requests a network slice. Thus, the slice activation system 115 may conserve computing resources, networking resources, and/or other resources that would have otherwise been consumed by failing to provide network slices to critical infrastructure users during times of network congestion, providing a poor user experience for critical infrastructure users during times of network congestion, losing network traffic during times of network congestion, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
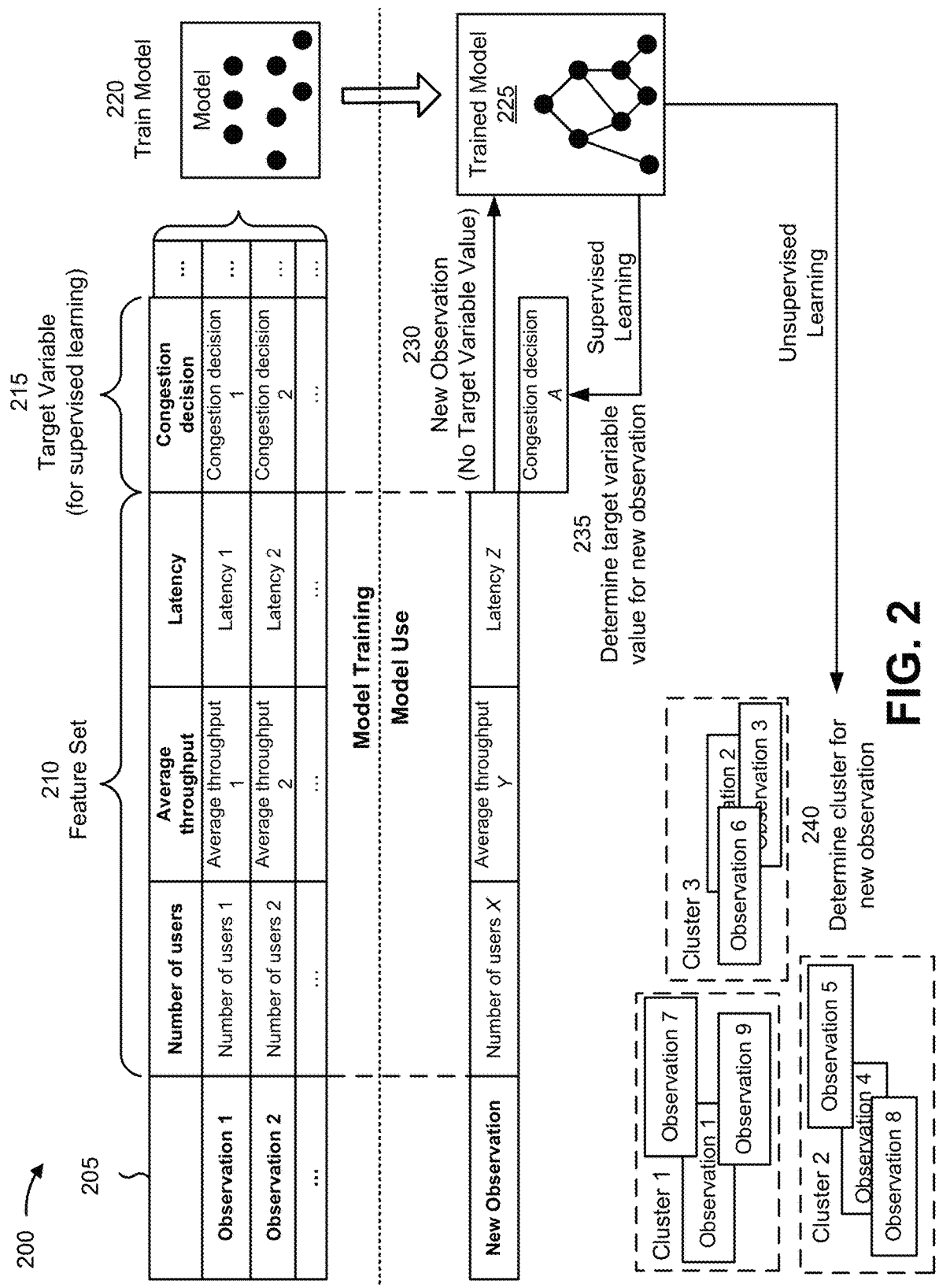
FIG. 2 is a diagram illustrating an example of training and using a machine learning model in connection with systems and methods for determining a congestion decision for a network.

FIG. 2 is a diagram illustrating an example 200 of training and using a machine learning model in connection with systems and methods for determining a congestion decision for a network. The machine learning model training and usage described herein may be performed using a machine learning system. The machine learning system may include or may be included in a computing device, a server, a cloud computing environment, or the like, such as the slice activation system 115 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input), as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on the input. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a number of users, a second feature of an average throughput, a third feature of latency, and so on. As shown, for a first observation, the first feature may have a value of number of users 1, the second feature may have a value of average throughput 1, the third feature may have a value of latency 1, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is a congestion decision, which has a value of congestion decision 1 for the first observation. The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of number of users X, a second feature of average throughput Y, a third feature of latency Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of congestion decision A for the target variable of the congestion decision for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a number of users cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., an average throughput cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified. The recommendations, actions, and clusters described above are provided as examples, and other examples may differ from what is described above.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model).

In this way, the machine learning system may apply a rigorous and automated process to determine a congestion decision for a network. The machine learning system may enable recognition and/or identification of tens, hundreds, thousands, or millions of features and/or feature values for tens, hundreds, thousands, or millions of observations, thereby increasing accuracy and consistency and reducing delay associated with determining a congestion decision for a network relative to requiring computing resources to be allocated for tens, hundreds, or thousands of operators to manually determine a congestion decision for a network using the features or feature values.

As indicated above, FIG. 2 is provided is an example. Other examples may differ from what is described in connection with FIG. 2.

Figure 3:
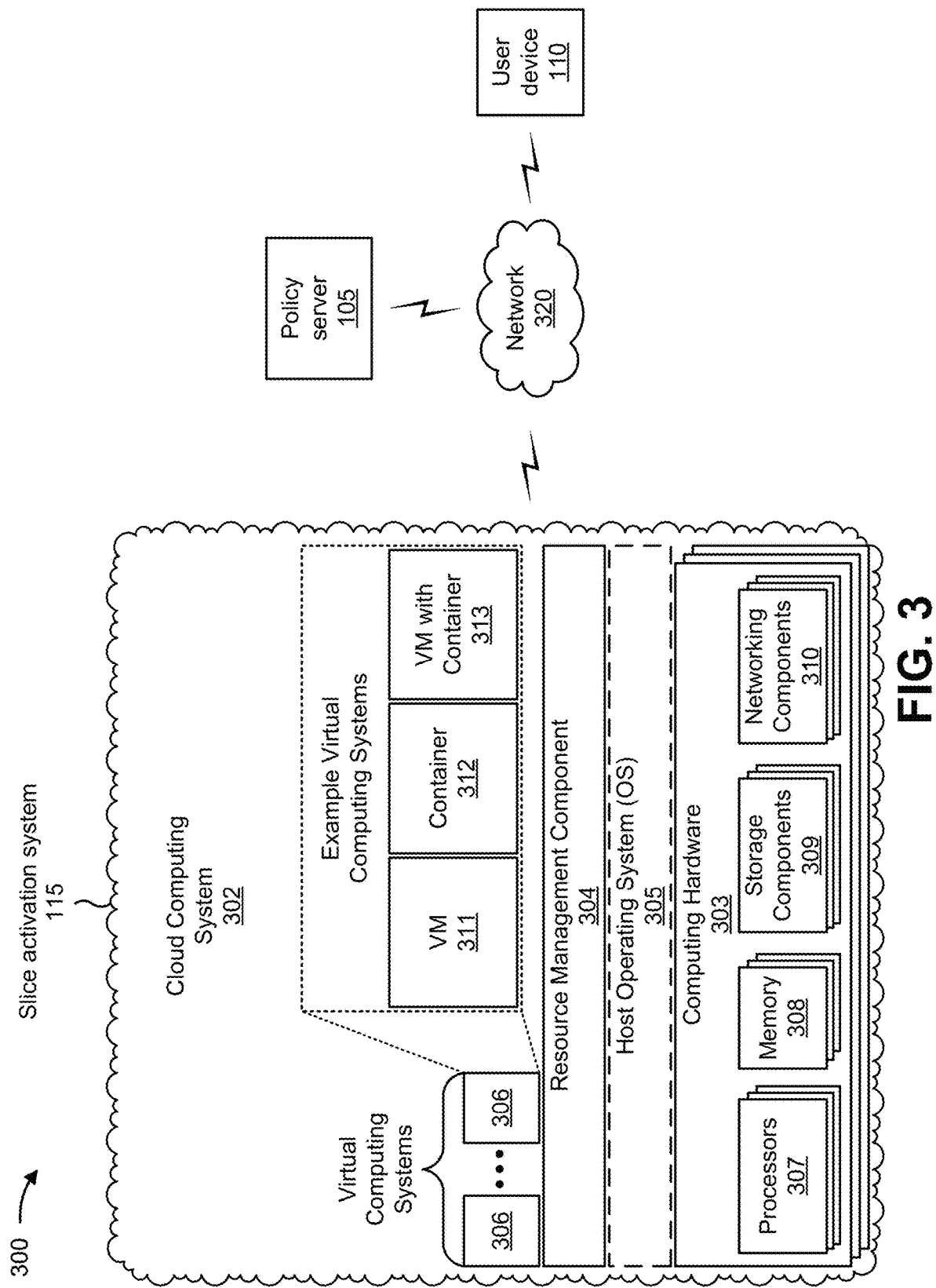
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the slice activation system 115, which may include one or more elements of and/or may execute within a cloud computing system 302. The cloud computing system 302 may include one or more elements 303-313, as described in more detail below. As further shown in FIG. 3, the environment 300 may include the policy server 105, the user device 110, and/or a network 320. Devices and/or elements of the environment 300 may interconnect via wired connections and/or wireless connections.

The policy server 105 may include one or more devices capable of receiving, generating, storing, processing, providing, and/or routing information, as described elsewhere herein. The policy server 105 may include a communication device and/or a computing device. For example, the policy server 105 may include a server, such as an application server, a client server, a web server, a database server, a host server, a proxy server, a virtual server (e.g., executing on computing hardware), or a server in a cloud computing system. In some implementations, the policy server 105 may include computing hardware used in a cloud computing environment.

The user device 110 may include one or more devices capable of receiving, generating, storing, processing, and/or providing information, as described elsewhere herein. The user device 110 may include a communication device and/or a computing device. For example, the user device 110 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the slice activation system 115 may include one or more elements 303-313 of the cloud computing system 302, may execute within the cloud computing system 302, and/or may be hosted within the cloud computing system 302, in some implementations, the slice activation system 115 may not be cloud-based (e.g., may be implemented outside of a cloud computing system) or may be partially cloud-based. For example, the slice activation system 115 may include one or more devices that are not part of the cloud computing system 302, such as the device 400 of FIG. 4, which may include a standalone server or another type of computing device. The slice activation system 115 may perform one or more operations and/or processes described in more detail elsewhere herein.

The network 320 may include one or more wired and/or wireless networks. For example, the network 320 may include a cellular network (e.g., a 5G network, a 4G network, an LTE network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 320 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
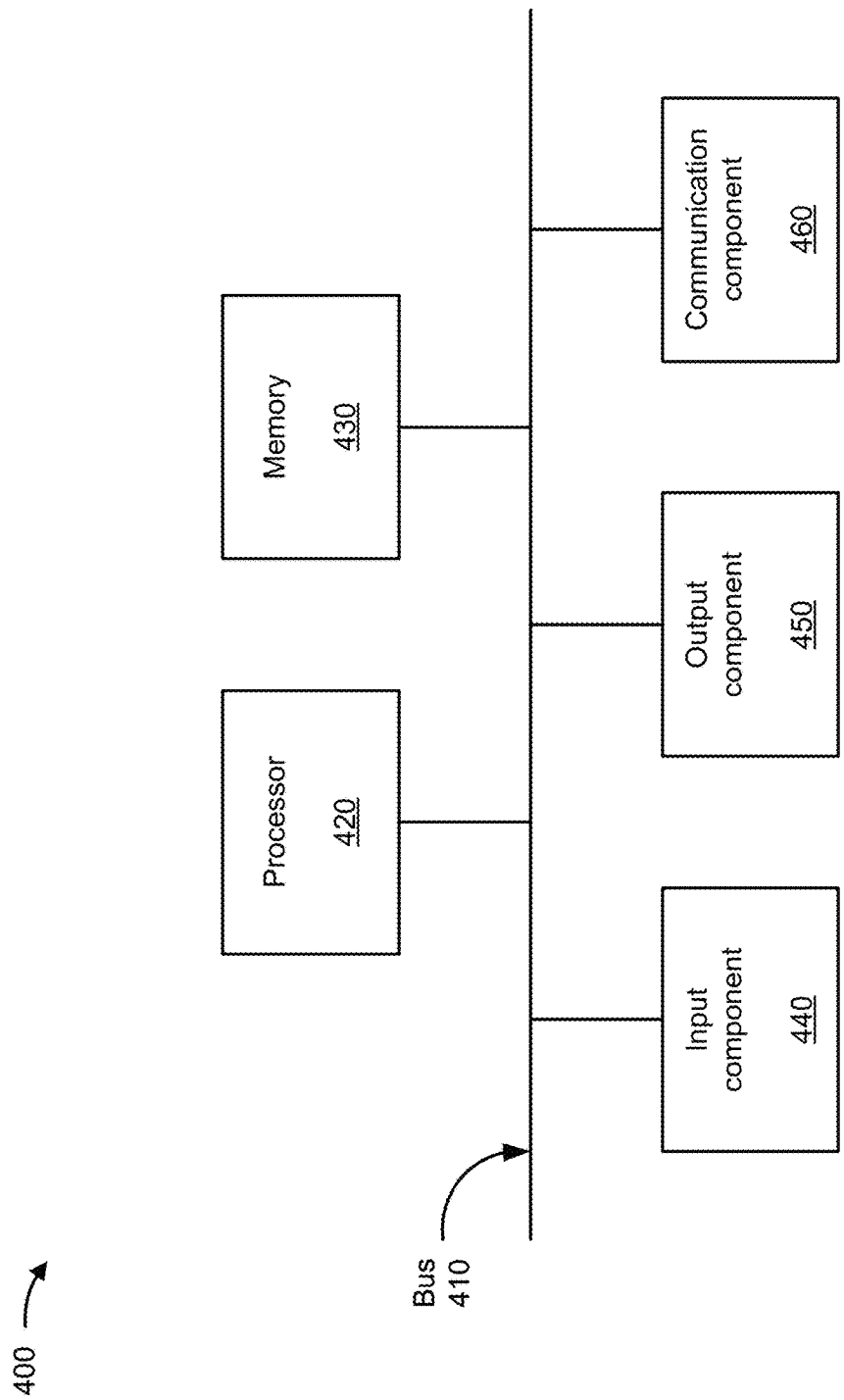
FIG. 4 is a diagram of example components of one or more devices of FIG. 3.

FIG. 4 is a diagram of example components of a device 400, which may correspond to the policy server 105, the user device 110, and/or the slice activation system 115. In some implementations, the policy server 105, the user device 110, and/or the slice activation system 115 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for utilizing a deep learning model to detect network congestion and automatically deploy a network slice. In some implementations, one or more process blocks of FIG. 5 may be performed by a device (e.g., the slice activation system 115). In some implementations, one or more process blocks of FIG. 5 may be performed by another device or a group of devices separate from or including the device, such as a server device (e.g., the policy server 105). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving network congestion data associated with a network providing a network slice to a user device and that includes data identifying a number of users, an average throughput, a latency, and one or more key performance indicators associated with the network (block 510). For example, the device may receive network congestion data associated with a network providing a network slice to a user device and that includes data identifying a number of users, an average throughput, a latency, and one or more key performance indicators associated with the network, as described above. In some implementations, the user device is associated with a public safety user. In some implementations, the network is a radio access network.

As further shown in FIG. 5, process 500 may include receiving media data associated with the user device (block 520). For example, the device may receive media data associated with the user device, as described above. In some implementations, the media data includes data identifying one or more of social media events affecting the user device, news events affecting the user device, or planned events affecting the user device.

As further shown in FIG. 5, process 500 may include receiving weather data associated with the user device (block 530). For example, the device may receive weather data associated with the user device, as described above. In some implementations, the weather data includes data identifying one or more of a natural disaster affecting the user device or a weather event affecting the user device.

As further shown in FIG. 5, process 500 may include processing the number of users, the average throughput, the latency, and the one or more key performance indicators, with a deep learning model, to generate a congestion decision for the network (block 540). For example, the device may process the number of users, the average throughput, the latency, and the one or more key performance indicators, with a deep learning model, to generate a congestion decision for the network, as described above. In some implementations, the deep learning model is a recurrent neural network model. In some implementations, the network experiences congestion when a bandwidth of the network required to serve all active applications is substantially equal to or exceeds an available bandwidth that the network supports.

As further shown in FIG. 5, process 500 may include selectively activating a new network slice for the user device based on the congestion decision indicating congestion in the network, or maintaining the network slice for the user device based on the congestion decision indicating no congestion in the network (block 550). For example, the device may selectively activate a new network slice for the user device based on the congestion decision indicating congestion in the network, or maintain the network slice for the user device based on the congestion decision indicating no congestion in the network, as described above. In some implementations, the user device is configured for the new network slice.

In some implementations, process 500 includes selecting a region, a duration, and a type for the new network slice based on activating the new network slice and based on the media data and the weather data, and causing the network to provision the new network slice for the user device based on the region, the duration, and the type for the new network slice. In some implementations, the network causes the user device to utilize the new network slice in the region and for the duration. In some implementations, the user device is configured to utilize an application via the new network slice. In some implementations, process 500 includes causing the network to instruct the user device to provide a provisioned application on the new network slice. In some implementations, the type of the new network slice includes one or more of a public safety application type, a streaming service type, an industrial application type, a voice-over-new-radio application type, or an autonomous vehicle application type.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
  receiving, by a device, network congestion data associated with a network providing a network slice to a user device and that includes data identifying a number of users, an average throughput, a latency, and one or more key performance indicators associated with the network;
  receiving, by the device, media data associated with the user device;
  receiving, by the device, weather data associated with the user device;
  processing, by the device, the number of users, the average throughput, the latency, and the one or more key performance indicators, with a deep learning model, to generate a congestion decision for the network;
  selectively:
    activating, by the device, a new network slice for the user device based on the congestion decision indicating congestion in the network, or
    maintaining, by the device, the network slice for the user device based on the congestion decision indicating no congestion in the network;
  selecting a region, a duration, and a type for the new network slice based on activating the new network slice and based on the media data and the weather data; and
  causing the network to provision the new network slice for the user device based on the region, the duration, and the type for the new network slice.

2. The method of claim 1, wherein the network causes the user device to utilize the new network slice in the region and for the duration.

3. The method of claim 1, wherein the user device is configured to utilize an application via the new network slice.

4. The method of claim 1, further comprising:
causing the network to instruct the user device to provide a provisioned application on the new network slice.

5. The method of claim 1, wherein the user device is associated with a public safety user.

6. The method of claim 1, wherein the user device is configured for the new network slice.

7. A device, comprising:
one or more processors configured to:
receive network congestion data associated with a network providing a network slice to a user device, wherein the network congestion data includes data identifying a number of users, an average throughput, a latency, and one or more key performance indicators associated with the network;
receive media data associated with the user device;
receive weather data associated with the user device;
process the number of users, the average throughput, the latency, and the one or more key performance indicators, with a deep learning model, to generate a congestion decision for the network;
activate a new network slice for the user device based on the congestion decision indicating congestion in the network;
select a region, a duration, and a type for the new network slice based on activating the new network slice and based on the media data and the weather data; and
cause the network to provision the new network slice for the user device based on the region, the duration, and the type for the new network slice.

8. The device of claim 7, wherein the deep learning model is a recurrent neural network model.

9. The device of claim 7, wherein the media data includes data identifying one or more of social media events affecting the user device, news events affecting the user device, or planned events affecting the user device.

10. The device of claim 7, wherein the weather data includes data identifying one or more of a natural disaster affecting the user device or a weather event affecting the user device.

11. The device of claim 7, wherein the type of the new network slice includes one or more of a public safety application type, a streaming service type, an industrial application type, a voice-over-new-radio application type, or an autonomous vehicle application type.

12. The device of claim 7, wherein the network is a radio access network.

13. The device of claim 7, wherein the network experiences congestion when a bandwidth of the network required to serve all active applications is substantially equal to or exceeds an available bandwidth that the network supports.

14. A non-transitory computer-readable medium storing a set of instructions, the set of instructions comprising:
one or more instructions that, when executed by one or more processors of a device, cause the device to:
receive network congestion data associated with a network providing a network slice to a user device, wherein the network congestion data includes data identifying a number of users, an average throughput, a latency, and one or more key performance indicators associated with the network;
receive media data associated with the user device;
receive weather data associated with the user device;
process the number of users, the average throughput, the latency, and the one or more key performance indicators, with a deep learning model, to generate a congestion decision for the network;
selectively:
activate a new network slice for the user device based on the congestion decision indicating congestion in the network, or
maintain the network slice for the user device based on the congestion decision indicating no congestion in the network;
select a region, a duration, and a type for the new network slice based on activating the new network slice and based on the media data and the weather data; and
cause the network to provision the new network slice for the user device based on the region, the duration, and the type for the new network slice.

15. The non-transitory computer-readable medium of claim 14, wherein the user device is associated with a public safety user and is configured for the new network slice.

16. The non-transitory computer-readable medium of claim 14, wherein the media data includes data identifying one or more of social media events affecting the user device, news events affecting the user device, or planned events affecting the user device.

17. The non-transitory computer-readable medium of claim 14, wherein the weather data includes data identifying one or more of a natural disaster affecting the user device or a weather event affecting the user device.

18. The non-transitory computer-readable medium of claim 14, wherein the network experiences congestion when a bandwidth of the network required to serve all active applications is substantially equal to or exceeds an available bandwidth that the network supports.

19. The method of claim 1, wherein the weather data includes data identifying a natural disaster or a weather event and timing associated with the natural disaster or the weather event.

20. The non-transitory computer-readable medium of claim 14, wherein the deep learning model includes a bi-directional artificial neural network.

* * * * *